May 27, 1952 — L. R. CHASE — 2,598,223
DISCHARGE CONVEYER ATTACHMENT FOR POTATO DIGGERS
Filed May 14, 1947 — 4 Sheets-Sheet 1

Inventor
Linwood Roy Chase

May 27, 1952 L. R. CHASE 2,598,223
DISCHARGE CONVEYER ATTACHMENT FOR POTATO DIGGERS
Filed May 14, 1947 4 Sheets-Sheet 2

Inventor
Linwood Roy Chase

By *Clarence A. O'Brien
and Harvey B. Jacobson*
Attorneys

May 27, 1952  L. R. CHASE  2,598,223
DISCHARGE CONVEYER ATTACHMENT FOR POTATO DIGGERS
Filed May 14, 1947  4 Sheets-Sheet 3

Inventor
Linwood Roy Chase

By *Clarence A. O'Brien and Harvey B. Jacobson*
Attorneys

May 27, 1952   L. R. CHASE   2,598,223
DISCHARGE CONVEYER ATTACHMENT FOR POTATO DIGGERS
Filed May 14, 1947   4 Sheets-Sheet 4
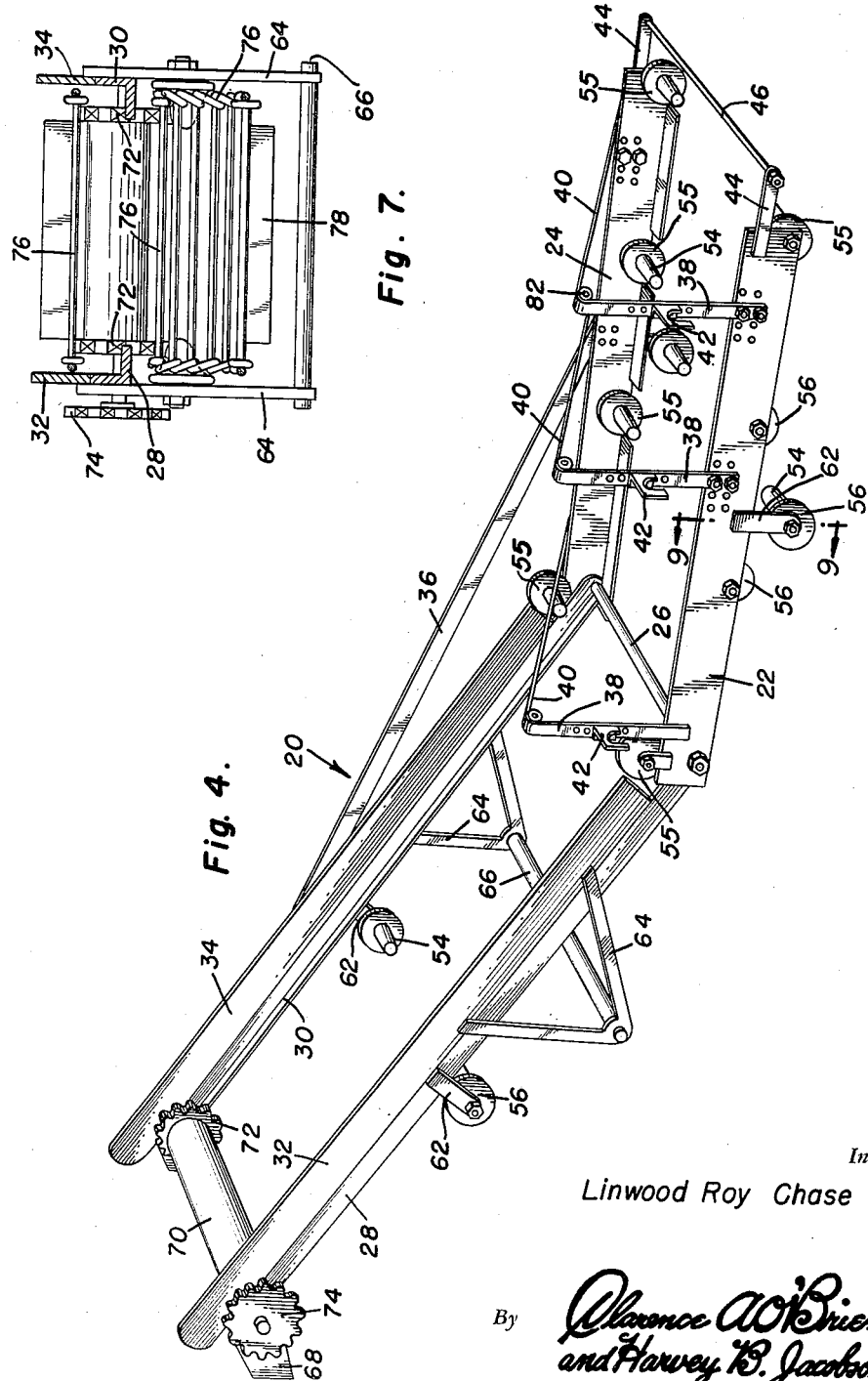
Inventor
Linwood Roy Chase Patented May 27, 1952

2,598,223

UNITED STATES PATENT OFFICE 2,598,223

DISCHARGE CONVEYER ATTACHMENT FOR POTATO DIGGERS

Linwood Roy Chase, Presque Isle, Maine

Application May 14, 1947, Serial No. 748,142

3 Claims. (Cl. 198—108)

This invention comprises novel and useful improvements in a rock picker attachment and more specifically pertains to an apparatus which is adapted for attachment to and actuation by a two-row potato digger for removing rocks from the soil, separating the rocks from the dirt and disposing of the rocks in a suitable manner.

The principal object of this invention resides in providing an apparatus for separating rocks from the soil, and delivering the rocks to a suitable receptacle such as a truck or the like for disposal.

A further important object of the invention resides in providing an apparatus in accordance with the preceding object which shall be in the form of an attachment which may be readily connected to and operated by a conventional form of potato digger.

Another purpose of this invention resides in providing an appliance in accordance with the foregoing objects, wherein the rock picker may be attached to and actuated by a potato digger of the two-row type.

Further subordinate objects of the invention consist in providing an appliance in conformity with the above mentioned objects, which shall be provided with a novel and improved means for separating the rocks from the soil; for elevating and discharging the separated rocks to a desired point of disposal; which shall be provided with improved means for quickly attaching or disconnecting the appliance from a potato digger; and which shall be of simple, durable and dependable construction and with all highly efficacious for the purposes intended.

These, together with various ancillary objects of the invention which will later become apparent as the following description proceeds, are attained by this device, the preferred embodiment of which has been illustrated, by way of example only, in the accompanying drawings, wherein:

Figure 4 is a perspective view of the frame of the rock picker attachment;

Figure 7 is a fragmentary detailed view of the rock picker and elevator taken substantially upon the plane of the section line 7—7 of Figure 2;

Figure 8 is an enlarged fragmentary detailed view in vertical section, substantially upon the plane indicated by the section line 8—8 of Figure 5, of the power take-off means for operating the rock picker from a wheel of the potato digger.

Figure 1:
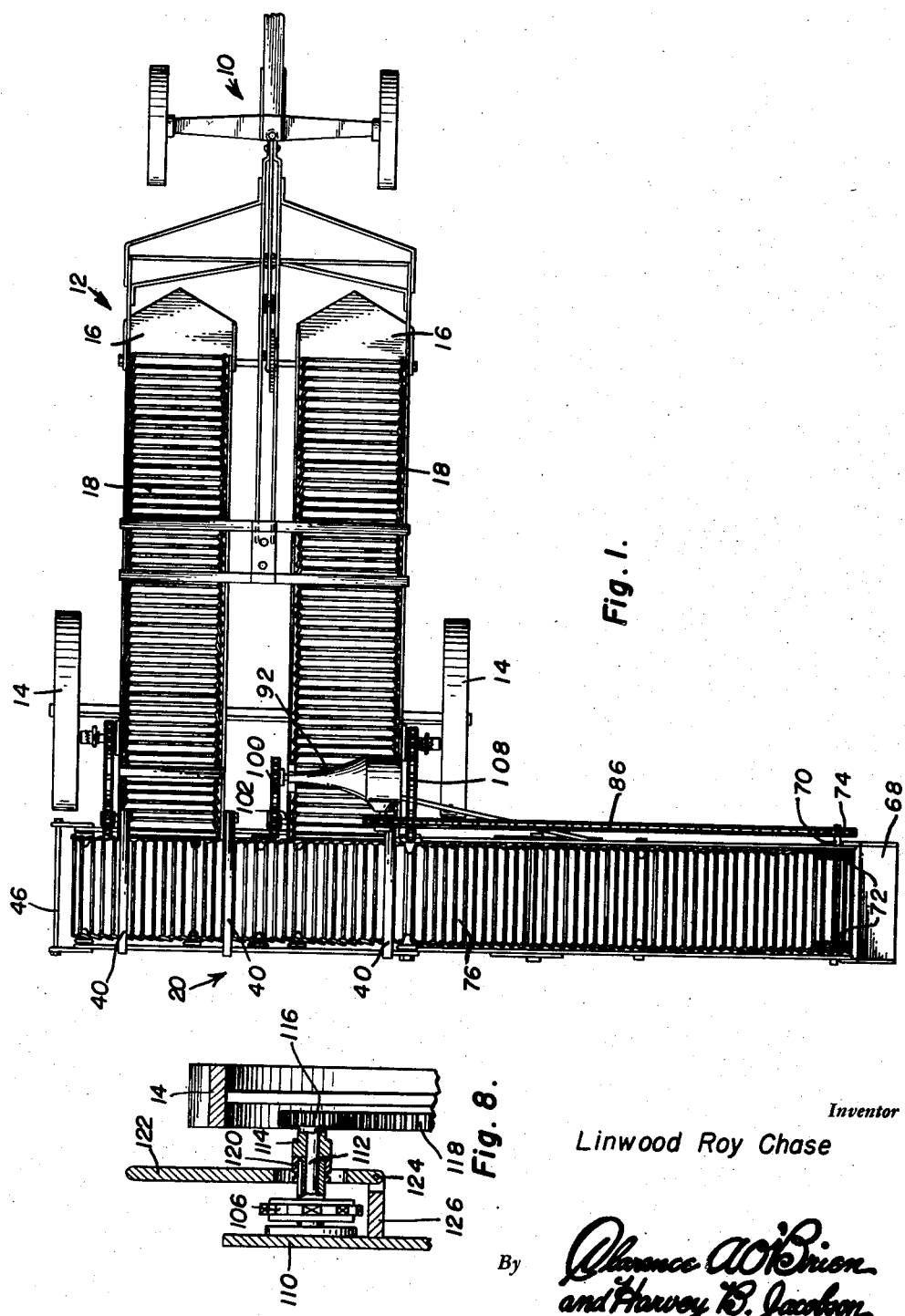
Figure 1 is a top plan view of the rock picker attachment connected to a two-row potato digger and a tractor.

Referring now more specifically to the attached drawings, wherein like numerals indicate similar parts throughout the various views, attention is directed first to Figure 1 wherein the numeral 10 designates generally the portion of the rear end of a tractor of any suitable type adapted for handling farm implements.

Suitably connected to the rear of the tractor 10 in any conventional manner, is a conventional type of two-row potato digger 12 and which is provided with a pair of supporting wheels 14, and a pair of potato digger blades or plough 16 at the front end of the attachment. A pair of elevators 18 are disposed immediately back of each of the diggers 16, and are preferably of the endless chain type, whereby the potatoes and soil elevated by the plough 16 are shaken and handled, the soil dropping through the interstices of the chain conveyor while the potatoes are carried and discharged from the rear end thereof. As so far described, this two-row potato digger and its attachment to the tractor 10 are of known design.

Suitably mounted upon the rear end of the potato digger 12, and extending transversely thereof, is the rock picker designated as an entirety by the reference numeral 20. This rock picker is constructed for easy attachment to and removal from the potato digger, and is adapted to be actuated thereby, in a manner and by a means to be subsequently set forth.

Reference is now made more particularly to Figure 4 for an understanding of the frame construction of the rock picker attachment 20. As shown, the attachment comprises a base frame consisting of a pair of angle iron members 22 and 24 which are parallel and spaced from, and are disposed transversely of the potato digger at the rear end thereof. At their ends, the base members 22 and 24 are pivotally connected as by a transverse axle 26 with an elevator plane construction consisting of parallel, spaced angle iron members 28 and 30 which have longitudinal flat strip extension of their upper sides as at 32 and 34, and as shown in Figure 7. The side strips 32 and 34 are rigidly attached to the angle iron frame members 28 and 30. An inclined brace rod 36 in the form of a flat strip is rigidly attached to the angle iron 30 and to the base member 24, for rigidly securing in inclined relation, the elevator frame and the base frame assembly.

A plurality of vertical standards 38 are detachably or otherwise secured to the frame member 22, at one extremity, while the other extremity thereof is bent downwardly as at 40 and is rigidly attached to the other angle iron frame member 24, thereby providing a plurality of reinforcing means between the two base frame members and a supporting means therefor as set forth hereinafter.

Figure 6:
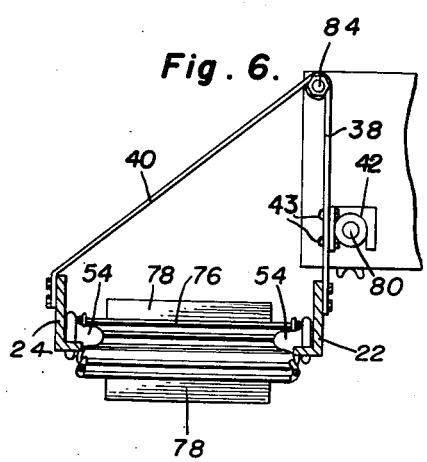
Figure 6 is a fragmentary detailed sectional view taken substantially upon the plane of the section line 6—6 of Figure 2.
Figure 3:
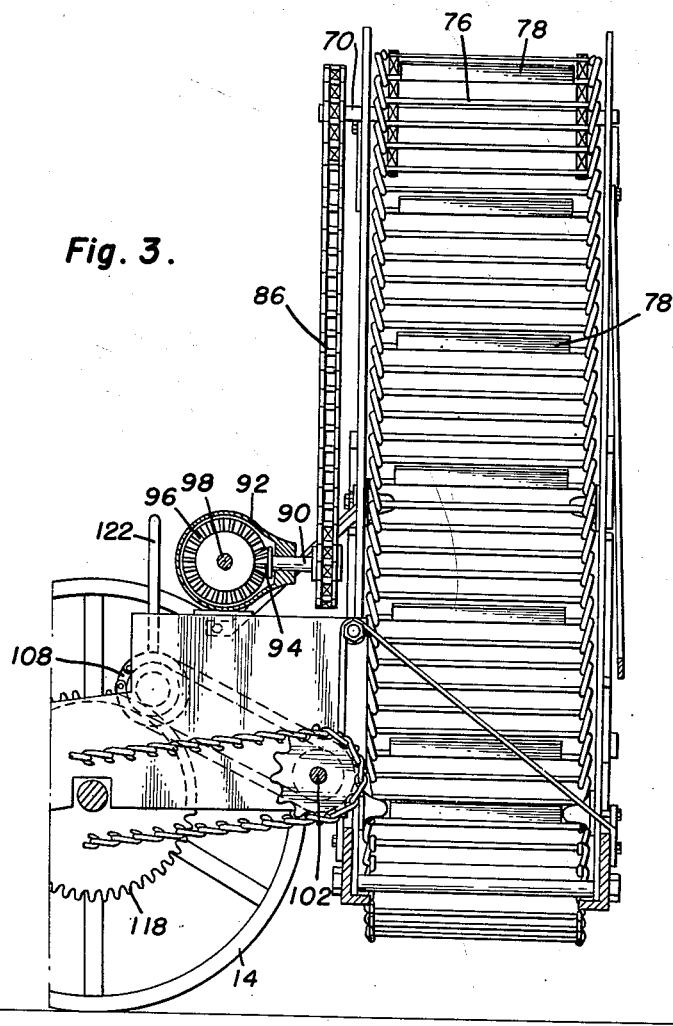
Figure 3 is an enlarged elevational view taken substantially upon the plane of the section line 3—3 of Figure 2.

A laterally extending bracket or holder 42 is adjustably secured to each of the vertical standards 38, as by means of a nut and bolt fastening, indicated generally by the numeral 43 in Figure 6, engageable selectively in one of a series of apertures in each of the standards 38, for positioning the holder at any desired elevation thereon.

Extending rearwardly from the sides of the angle iron members 22 and 24, are a pair of straps 44, whose outer extremities have secured thereto a transversely extending bar 46.

Figure 9:
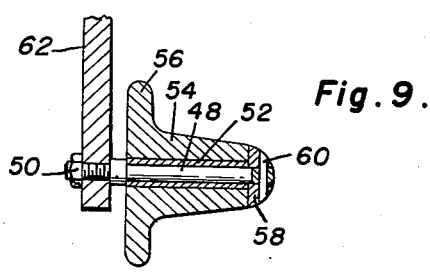
Figure 9 is an enlarged fragmentary detailed view taken substantially upon the plane of the section line 9—9 of Figure 4.

As shown more in detail in Figure 9 and in Figure 4, a plurality of transversely and inwardly extending guide rollers 54 and 55 are suitably attached at appropriate points upon the angle iron members 22, 24, 28 and 30. A laterally extending stub axle or shaft 48 having one end thereof screw threaded for attachment as by a nut 50 in a supporting structure such as the bracket 62 depending from these frame members, is provided with a bearing bushing 52 upon which is rotatably mounted a generally conical type of roller 54 having a laterally extending flange 56 at the end adjacent the supporting surface 62. The conical roller 54 is retained upon its axle by means of a rounded cap 58 secured to the axle as by a pin 60.

Other rollers 55, similar in construction and mounting to the rollers 54, are carried in any suitable manner by the frame members 22 and 24.

A pair of V-shaped legs or braces 64 are suitably secured upon the sides of the angle iron members 28 and 30 of the elevator frames, and at their apex are connected as by a transversely extending rod 66. At its upper end, the elevator frame of the picker is provided with a downwardly sloping or inclined discharge shoot 68 rigidly attached to the frame angle iron members 28 and 30, and has journaled therein a rotatable shaft 70 having a pair of sprockets 72 disposed inwardly of the frame members 28 and 30, and an externally positioned driving sprocket 74.

Figure 2:
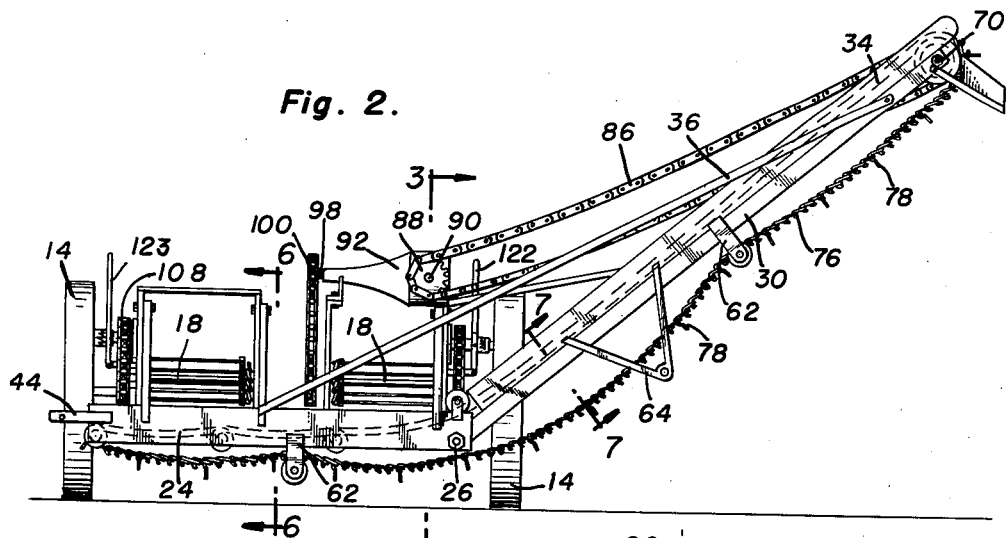
Figure 2 is a rear elevational view of the apparatus of Figure 1.
Figure 5:
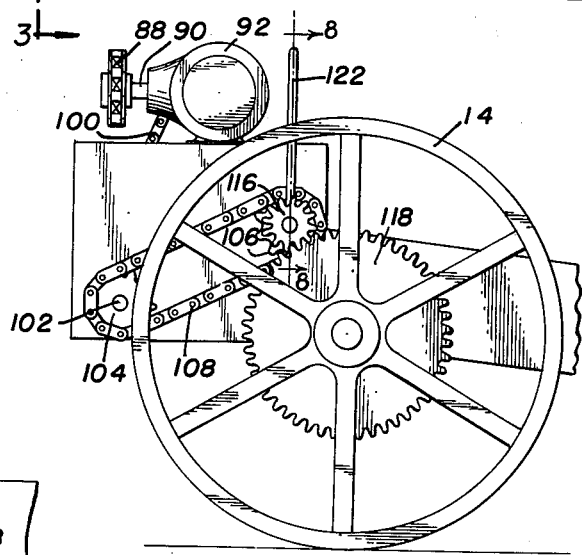
Figure 5 is an enlarged side elevational view of a wheel of the potato digger showing the driving connection of the rock picker therewith.

As shown best in Figures 2 and 7, a conveyor belt 76 of the endless chain type is entrained over the driving sprocket 72, and has its upper flight resting and guided upon the above mentioned guide and support rollers 54, while its lower flight, as shown in Figure 2, underlies the framework and is supported upon the guide rollers 54 attached to the depending straps or arms 62 extending below the framework, and above the transverse rod 66 and within the transverse end rod 46. These two latter rods constitute guard means for the endless chain.

At suitable spaced intervals along its outer surface, the endless chain is provided with a plurality of transversely disposed upstanding strips or cleats 78 which may be welded or otherwise secured to the endless chain, and constitute lifts for elevating rocks up the endless chain to the discharge shoot 68.

As shown best in the detailed view of Figure 6, the rock picker attachment is supported upon the potato picker by means of the support brackets 42 which are hooked over and supported upon suitable support rods or bosses 80 extending from appropriate portions of the framework of the potato digger. The vertical standards 38 and inclined legs 40 of the support braces of the base of the rock picker, are provided at their apex with eyelets or bushings 82 which are secured as by bolts or the like 84 to the above mentioned framework of the potato picker. Thus, by means of the bosses 80 and bolts 84, the supporting and reinforcing members 38 and 40 conveniently attach the rock picker to the rear portion of the framework of the potato picker. Attention is now directed more specifically to Figures 2, 3, 5 and 8 for an understanding of the operating means of the rock picker endless chain elevator.

A sprocket drive chain 86 is entrained over the driving sprocket 74, above mentioned, and over a sprocket 88 mounted upon a shaft 90 which is suitably journaled in a housing 92 and is connected by means of bevelled gearing 94 and 96 with a rotatable shaft 98. The latter is connected by suitable chain and sprocket drives indicated generally at 100 with the axle shaft 102 which drive one of the potato picker conveyor chains 18. Each of these potato picker elevator conveyors are driven by a similar gearing connection from the adjacent wheel 14 of the potato picker by the mechanism shown in Figure 8.

For this purpose, the shaft 102 is provided upon its outer extremity with a sprocket 104 which is connected with a sprocket 106 as by means of a sprocket chain 108. The sprocket 106 is suitably journaled at 110 to a portion of the frame of the potato picker by means of an axle 112. Freely rotatable on the end of the axle 112, is an axial clutch member 114 whose other extremity carries a gear 116 in constant mesh with the driving gear 118 mounted upon the hub of the wheel 14 for driving relation therewith.

A clutch collar 120 splined upon the axle 112 for longitudinal movement therealong, and is adapted to co-operate with the above mentioned clutch member 114. The clutch collars of the two gearing assemblies are controlled by levers 122 and 123 pivoted as at 124 to a supporting bracket or lug 126 carried by the above mentioned frame member 110. It may thus be seen that the levers 122 and 123 may be selectively operated to disconnect the clutch member 120 from the clutch member 114, thereby releasing the driving connection between the corresponding wheel 14 and the adjacent endless chain 18 of the potato picker. At the same time, the lever 122 simultaneously controls by this mechanism the driving arrangement of the sprocket chain 86, and thereby the operation of the potato of the rock picker elevator chain 86.

It may thus be seen that the rock picker mechanism derives its power from the potato digger chain mechanism which in turn is operated by a clutch and gearing connection from a wheel of the potato digger.

From the foregoing, it is believed that the manner of operating the device will now be readily understood. As the potato digger moves forward under the impulse of the tractor 10, the plough points 16 scoop up dirt and rocks and deliver them to the potato digger endless chain 18, one or both of which may be placed in operation. During their operation, the agitating of the soil and rocks so removed by the plough points 16, are separated during their travel along the length rearwardly of the conveyor chain 18 whereby the rocks, substantially free from soil are delivered to the transversely disposed rock picker mechanism. This latter has first a flat horizontal portion which agitates and moves the rock and any dirt adhering thereto, whereby the latter thoroughly separated from the rocks, these being now carried up the inclined portion of the picker mechanism by means of the above mentioned transverse slots or cleats 78, and this discharged from the discharge shoot 68 at the upper end thereof into a truck or other receptacle for subsequent disposal.

Since various modifications of the device will readily occur to those skilled in the art after a consideration of the foregoing specification and attached drawings, it is not intended to limit the invention to the exact construction shown and described, but all suitable modifications may be resorted to falling within the scope of the appended claims.

What is claimed as new is as follows:

1. A conveyor attachment for a potato digger comprising a first frame having spaced parallel elongated horizontal bars, a second frame having vertically inclined spaced parallel elongated bars including upper and lower ends, said lower ends being secured to said horizontal bars, a shaft rotatable on the upper ends of said vertical bars, sprockets on said shaft disposed inwardly of said vertical bars, guide rollers depending from said horizontal and vertically inclined bars, an endless conveyor belt entrained over said sprockets and supported upon said guide rollers, said conveyor belt including spaced transverse lifting cleats, means for bracing said horizontal bars, and means carried by said bracing means adapted for removably securing the conveyor attachment to a potato digger, said bracing means including a plurality of vertical standards secured to one of said horizontal bars and plates terminally secured to the upper ends of said standards and to the other of said horizontal bars.

2. The combination of claim 1 wherein said securing means includes laterally extending hooks carried by said vertical standards and adapted to engage a portion of a potato digger.

3. A conveyor attachment for a potato digger comprising a first frame having spaced parallel elongated horizontal bars, a second frame having vertically inclined spaced parallel elongated bars including upper and lower ends, said lower ends being secured to said horizontal bars, a shaft rotatable on the upper ends of said vertical bars, sprockets on said shaft disposed inwardly of said vertical bars, guide rollers depending from said horizontal and vertical bars, an endless conveyor belt entrained over said sprockets and supported upon said guide rollers, said conveyor belt including spaced transverse lifting cleats, means for bracing said horizontal bars, and means carried by said bracing means adapted for removably securing the conveyor attachment to a potato digger, wherein said bracing means includes a plurality of vertical standards secured to one of said horizontal bars and plates terminally secured to the upper ends of said standards and to the other of said horizontal bars, said securing means including eyelets carried at the junctures of said vertical standards and said plates and adapted to receive a portion of a potato digger.

LINWOOD ROY CHASE.

REFERENCES CITED

The following references are of record in the file of this patent:

UNITED STATES PATENTS

| Number | Name | Date |
|---|---|---|
| 448,857 | Harrison | Mar. 24, 1891 |
| 930,719 | Battee | Aug. 10, 1909 |
| 1,000,826 | Liddell | Aug. 15, 1911 |
| 1,061,568 | Reuther | May 13, 1913 |
| 1,199,704 | Kendall | Sept. 26, 1916 |
| 1,241,880 | Penington | Oct. 2, 1917 |
| 1,761,286 | Zuckerman | June 3, 1930 |
| 1,854,349 | Satkowski | Apr. 19, 1932 |
| 2,095,428 | Batie | Oct. 12, 1937 |
| 2,174,605 | Spencer | Oct. 3, 1939 |
| 2,267,879 | Tillet | Dec. 30, 1941 |
| 2,294,252 | Supalla et al. | Aug. 25, 1942 |
| 2,404,629 | Griff | July 23, 1946 |
| 2,432,956 | Walz et al. | Dec. 16, 1947 |